Nov. 1, 1955  W. C. DEHNEL  2,722,352
ATTACHABLE TOOL BOX FOR UTILITIES TRUCKS
Filed Dec. 1, 1953  2 Sheets-Sheet 1

INVENTOR
William C. Dehnel

BY Mason, Fenwick & Lawrence
ATTORNEYS

Nov. 1, 1955 W. C. DEHNEL 2,722,352
ATTACHABLE TOOL BOX FOR UTILITIES TRUCKS
Filed Dec. 1, 1953 2 Sheets-Sheet 2
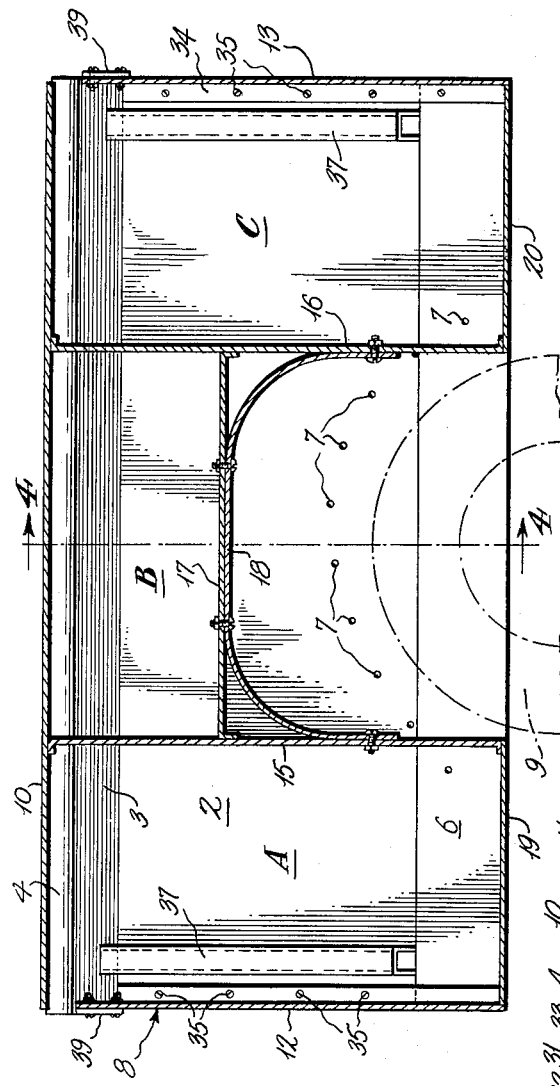
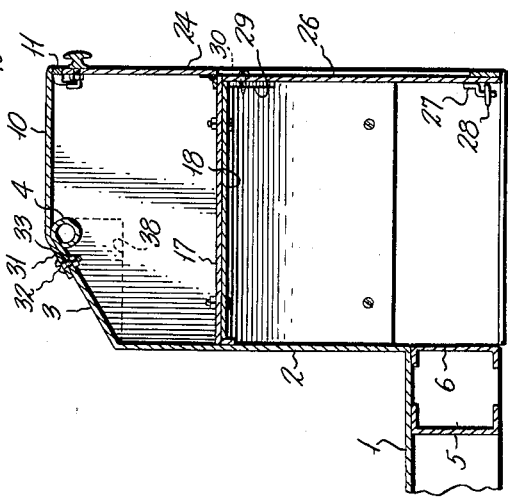
INVENTOR
William C. Dehnel
BY Mason, Fenwick & Lawrence
ATTORNEYS

ATTACHABLE TOOL BOX FOR UTILITIES TRUCKS

William C. Dehnel, San Angelo, Tex.

Application December 1, 1953, Serial No. 395,508

5 Claims. (Cl. 224—42.42)

This invention relates to tool boxes of the general type which characterize the pick-up trucks employed by utility companies. Under present practice, the tool box is built in as an integral part of the truck body, generally resting upon the floor of the body, and is so integrated with the structure of the body that the removal of the tool box component destroys the entity of the body itself.

The object of the present invention is the provision of a tool box of the general type referred to, as an attachment to any suitable pick-up truck body to convert into a typical utilities truck, and which may be removed at will and installed on another similar truck body, when desired.

Other objects of the invention will appear as the following description of a practical embodiment of the invention proceeds.

In the drawing which accompanies and forms a part of the following specification, and throughout the figures of which the same reference characters have been used to designate identical parts;

Figure 3 is a vertical longitudinal section taken along the line 3—3 of Figure 2;

Figure 4 is a cross-section taken along the line 4—4 of Figure 3.

Figure 1:
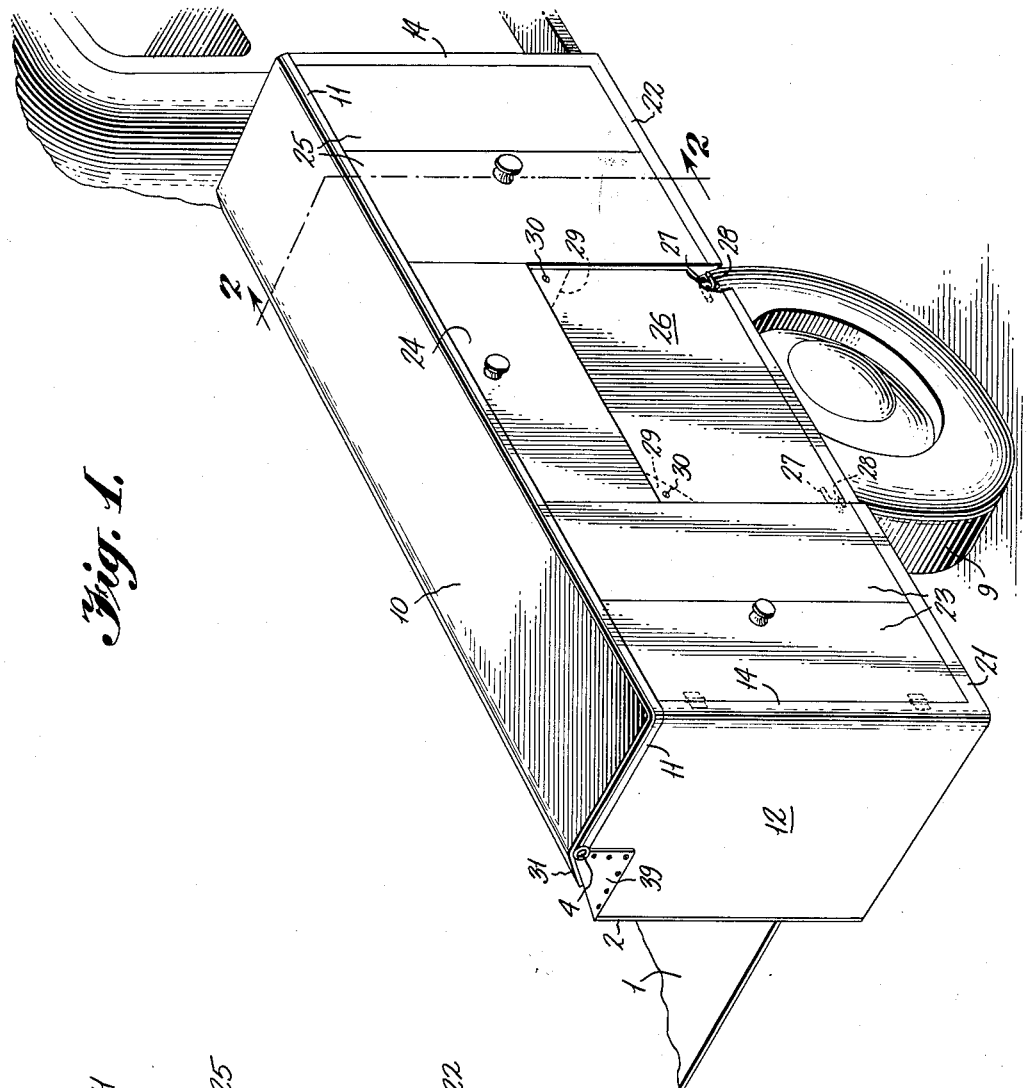
Figure 1 is a perspective view of a tool box made in accordance with the principles of the invention, installed on the body of a pick-up truck.

Before adverting to a description of the detailed structure, it may be stated that the conventional type of truck body to which the present invention is applicable, has an upwardly flared flange along the upper margin of the side panels terminated in a rolled bead, and the tool box of the present invention has novel structural features that are correlated with one or both of said side panels and with said flange and bead, in the positioning of the tool box and in its attachment.

Now referring in detail to the several figures, the numeral 1, Figure 4, represents the floor of a conventional pick-up truck body, one of the side panels being shown at 2, having the outwardly and upwardly flared flange 3, terminating in the rolled bead 4. The floor is supported upon longitudinal channel members 5 and 6, the latter being substantially flush with the panel 2.

The body normally has a rear fender bolted against the side panel and channel member 6, which fender is removed for the installation of the tool box, the arcuate pattern of the fender bolt holes being indicated at 7 in Figure 3, which are preferably plugged before the tool box is secured in place.

The tool box, which as a whole is designated by the numeral 8, extends along the side panel 2 of the truck body, on the outside thereof. It may be of any length desired. As shown, it extends from the rear of the side panel equidistantly on both sides of the vertical plane passing through the axis of the rear wheel 9 of the truck.

The tool box is prefabricated from plates of sheet metal welded or bolted together. The top plate 10 is the only full length member. It is of less depth than the other plates, since the flange 3 of the side panel 2 forms part of the top of the tool box, as will appear. The front and ends of the top plate 10 are provided, for finish, with a downwardly extending flange 11 of curved contour. The end plates 12 and 13 are alike. They are joined at their upper ends to the ends of the top plate 10 perpendicularly to said top plate. Said end plates have curved front flanges 14, also for finish. Two intermediate partitions 15 and 16 are fixed at their upper ends to the side of the top plate perpendicularly thereto, spaced apart equidistantly on opposite sides of the vertical axial plane of the wheel 9, forming the sides of a well of sufficient width to permit the intrusion of the upper portion of the vehicle wheel. The well is completed by a horizontal partition 17 bridging the space between the partitions 15 and 16 at such height as to allow for the maximum vertical oscillation of the vehicle wheel, and fixed at its ends to said partitions. Below the partition 17 a curved fender plate 18 is arranged, secured intermediately to the partition 17 and at its ends to the partitions 15 and 16.

The lower ends of the end plates 12 and 13, and the partitions 15 and 16 lie substantially at the level of the bottom of the channel member 6. Both plates 19 and 20 bridge the lower ends of the adjacent end plate 12 and partition 15, and the end plate 13 and partition 16. Said bottom plates have upturned flanges 21 and 22 at the front, as shown in Figure 1.

There is no back wall to the tool box, the side panel 2 serving as a back closure when the tool box is secured thereagainst. Three compartments A, B and C are formed respectively between the top and bottom members and the several partitions 15, 17 and 16. Said compartments are closed at the front respectively by the hinged doors 23, 24 and 25. The door 24 swings on a horizontal axis adjacent its lower edge. The front of the wheel well below the door 24 is closed by a skirt 26. This is inset with respect to the plane of the front of the door 24 a sufficient distance to permit the door 24 to swing downwardly until its knob is in contact with the skirt 26. The latter is removably secured in place by means such as the pins 27 fixed to the rear face of said skirt, which engage in eyes 28 projecting from the partitions 15 and 16 adjacent the front of the tool box. Small fillets 29 are fixed in the corners between the partitions 15, 16 and 17, having tapped holes 30. When the pins of the skirt have been inserted into the eyes 28, the skirt is pressed back against the fillets 29 and screwed in place by screws passing through holes in said skirt, which register with the tapped holes in the fillets.

The specific structural details that have been described thus far, especially the number and arrangement of the tool compartments and the doors therefor, as well as the fender skirt, are not the most important features of the invention, having been referred to principally to convey a notion of the general type of tool box which is typical with respect to service trucks employed by the utility companies.

That which is the more important phase of the invention is the means by which the tool box is supported by and secured to conventional pick-up truck bodies, with capability of removal therefrom as well as the correlated structure of tool box and truck body by which the latter participates in forming the closure, part of which is afforded by the tool box.

Figure 2:
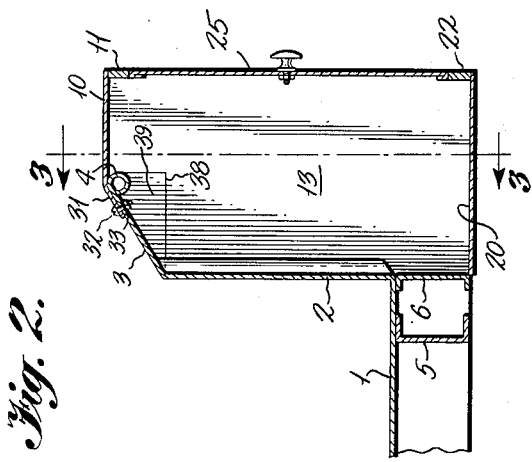
Figure 2 is a cross-section taken along the line 2—2 of Figure 1.

As indicated generally in all of the figures, and particularly in the cross-sectional views of Figures 2 and 4, the top plate 10 which as has been previously stated, is narrower than the depth of the tool box, is provided at its back edge with a flange 31 inclined downwardly at the same angle as the flange 3 of the truck body, and overlapping the adjacent margin of said body flange, including also the bead 4. When the flanges 31 and 3 are in proper lapped relation the tool box is in suspended relation to the flange 3 with its front in a plane parallel to the side panel 2 of the body, and with the rearward edges of the end plates 12 and 13 of the intermediate partitions, resting against the side panel 2 and the channel member 6. The lapped flanges 31 and 3 are secured together by bolts 32 passed through registering bolt holes 33. The end plates 12 and 13 in the embodiment shown, have inturned flanges 34 at their rear which are secured by bolts 35 passed through registering holes formed in the body side panel 2. The bolt holes in the truck body will be drilled to correspond to the bolt holes in the tool box. If desired, the bolted connections may be substituted by welded seams which, of course, would require to be fused in order to effect removal of the tool box. Emphasis is placed upon the fact that the tool box is added as an attachment to a complete truck body and its removal leaves the truck body intact. The bottom of the tool box preferably is at the level of the lower side of the channel member 6 so that said channel member forms a closure for the lower part of the tool box at the rear, the side panel 2 completing the rear closure for that part of the tool box above said channel member. The tool box being backless, will accommodate within it such external projections on the side panel 2 as the braces 37.

Ordinarily, the tool box will not be of such exact length that the end plates will embrace both ends of the flange 3 and bead 4 of the body side panel. Consequently, in general, said tool box will be slightly shorter than the side flange and bead. This presents a problem in mounting the tool box, since if the upper edges of the end plates 12 and 13 were shaped to follow the inclination of the flange 3, and were merely provided with recesses to fit the portions of the bead extending beyond them, the tool box could not be mounted, for it has to be lifted to pass the flange 31 over the flange 3 and then pushed inward, and this would be impossible due to interference between the adjacent edges of the end plates and the flange 3. It is, therefore, necessary to provide the end plates 12 and 13 with triangular cut-outs 38 extending inward from the plane of the rear of the tool box to a point forward of the bead, so that in installing the tool box it may be approached to the flange 3 in a tilted position until the flange 31 is in overlapping relation to the flange 3, and then let come down to normal position with the rear edges of the end plates 12 and 13 in contact with the side plate 2.

As the final step of installation, the cut-outs 38 are closed by the gussets 39, suitably bolted in place. In removing the tool box the gussets 39 will first be taken off and then the operations of installation be reversed.

While I have in the above description disclosed a practical embodiment of the invention, it will be understood by those skilled in the art that the specific details of construction and arrangement of parts, as shown and described, are by way of example and not to be construed as necessarily limiting the scope of the invention.

What I claim is:

1. Tool box for a truck body of the type having a vertical side panel with an outwardly flared top flange, said box comprising means forming top, end, front and bottom walls integrated to form an open backed enclosure, said top wall being narrower than said end walls and provided with a downwardly inclined flange along its rear edge adapted to engage the marginal portion of said top flange and to be secured thereto, said end walls extending rearwardly beyond said top wall to such extent as to contact said side panel when said downwardly inclined flange is positioned in engagement with said top flange, said front wall being provided with an access opening to the enclosure bounded by said walls and the parts of said truck body engaged thereby, and a door closing said opening.

2. Tool box for a truck body of the type having a vertical side panel with an outwardly flared top flange, said box comprising means forming top, end, front and bottom walls, integrated to form an open backed enclosure, said top wall being narrower than said end walls and provided with a downwardly inclined flange along its rear edge adapted to engage said top flange in overlapping relation and to be secured thereto, said end walls extending rearwardly beyond said top wall to such distance as to engage said side panel when said downwardly inclined flange is secured in position with respect to said top flange, and having inturned flanges along their rear edges securable to said side panel, said front wall being provided with an access opening to the enclosure bounded by said walls and the parts of said truck body engaged thereby, and a door closing said opening.

3. Tool box for a truck body of the type having a vertical side panel with an outwardly flaring top flange, said box comprising means forming top, end, front and bottom walls, integrated to form an open backed enclosure, said top wall being provided with a downwardly inclined flange along its rear edge adapted to engage said top flange in overlapping relation and to be secured thereto, said end walls extending rearwardly beyond said top wall to such distance as to engage said side panel when said downwardly inclined flange is secured in position with respect to said top flange, the upper corners of said end walls beneath said top flange when said tool box is in place having cut-out portions permitting said tool box to be positioned on said top flange from a lateral approach, and removable gussets secured to said end walls, closing said cut-outs, said front wall being provided with an access opening to the enclosure bounded by said walls and the parts of said truck body engaged thereby, and a door closing said opening.

4. Tool box for a truck body of the type having a vertical side panel with an outwardly flared top flange, said box comprising a rectangular open backed enclosure having doors at the front, end walls and a top wall, the latter terminating rearwardly at a shorter distance from the front than said end walls and having a downwardly inclined flange along its rear edge adapted to engage said top flange in overlapped relation with the rear of said box in edge contact with said vertical panel and closed by said panel.

5. Tool box for a truck body of the type having a vertical side panel with an outwardly flared top flange, said box comprising a rectangular open backed enclosure having doors at the front, end walls and a top wall, the latter terminating rearwardly at a shorter distance from the front than said end walls and having a downwardly inclined flange along its rear edge adapted to engage said top flange in overlapped relation with the rear of said box in edge contact with said vertical panel and closed by said panel, said end walls having indented upper corners adjacent said downwardly inclined flange, permitting said tool box to be positioned, from a lateral approach, with its downwardly inclined flange overlapping said top flange and its rear in contact with said vertical side panel.

References Cited in the file of this patent

UNITED STATES PATENTS

| | | |
|---|---|---|
| 1,398,884 | Aills | Nov. 29, 1921 |
| 1,816,028 | Thwaits | July 28, 1931 |
| 2,504,222 | Otto | Apr. 18, 1950 |
| 2,616,754 | Stahl | Nov. 4, 1952 |